US012332043B2

United States Patent
Stiepan et al.

(10) Patent No.: US 12,332,043 B2
(45) Date of Patent: Jun. 17, 2025

(54) MEASUREMENT METHOD FOR INTERFEROMETRICALLY DETERMINING A SURFACE SHAPE

(71) Applicant: Carl Zeiss SMT GmbH, Oberkochen (DE)

(72) Inventors: Hans Michael Stiepan, Aalen (DE); Sebastian Fuchs, Aalen (DE); Jochen Hetzler, Aalen (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 537 days.

(21) Appl. No.: 17/481,862

(22) Filed: Sep. 22, 2021

(65) Prior Publication Data
US 2022/0011095 A1  Jan. 13, 2022

Related U.S. Application Data (63) Continuation of application No. PCT/EP2020/057241, filed on Mar. 17, 2020.

(30) Foreign Application Priority Data

Mar. 26, 2019 (DE) ............ 10 2019 204 096.9

(51) Int. Cl.
*G01B 11/24* (2006.01)
*G01B 9/02* (2022.01)
(Continued)

(52) U.S. Cl.
CPC ...... *G01B 11/2441* (2013.01); *G01B 9/02039* (2013.01); *G02B 5/1871* (2013.01); *G02B 27/0012* (2013.01)

(58) Field of Classification Search
CPC ........... G01B 11/2441; G01B 9/02039; G02B 5/1871; G02B 27/0012
See application file for complete search history.

(56) References Cited

U.S. PATENT DOCUMENTS

| 7,728,987 B2 | 6/2010 | Arnold et al. |
| 8,345,262 B2 | 1/2013 | Schillke et al. |
| 8,675,206 B2 | 3/2014 | Osaki |
| 8,762,099 B2 | 6/2014 | Oshima |

(Continued)

FOREIGN PATENT DOCUMENTS

| DE | 102012217800 A1 | 4/2014 |
| DE | 102017216401 A1 | 10/2018 |

(Continued)

OTHER PUBLICATIONS

A.V. Prygun et al., "Experimental research of speckle suppression efficiency in the entire visible spectrum using moving 3D composite diffraction grating", Apr. 7, 2017, The Optical Society of India, 47(2):220-228 (Year: 2017).*

(Continued)

*Primary Examiner* — Tarifur R Chowdhury
*Assistant Examiner* — Joshua M Carlson
(74) *Attorney, Agent, or Firm* — Edell, Shapiro & Finnan, LLC (57) ABSTRACT

Measurement method for interferometrically determining a shape of a test object (14) surface (12) includes arranging a first diffractive optical element (30, 130, 230) in an input wave (18) beam path, to generate a first test wave (34) with a wavefront that is adapted to a desired shape of the optical surface, detecting a first interferogram generated by the first test wave after interaction with the test object surface, arranging a different diffractive optical element (32, 232) in the input wave beam path for generating a further test wave with a wavefront which is adapted to the desired shape of the optical surface, the first and the further diffractive optical elements differing in their respective diffraction structure configurations, capturing a further interferogram generated by the further test wave after interaction with the test object surface, and determining the surface shape of the test object by calculating the two interferograms.

10 Claims, 4 Drawing Sheets

(51) Int. Cl.
    *G02B 5/18*    (2006.01)
    *G02B 27/00*   (2006.01)

(56) References Cited

U.S. PATENT DOCUMENTS

| | | | |
|---|---|---|---|
| 10,197,715 B1* | 2/2019 | Tabirian | B29D 11/00432 |
| 10,337,850 B2 | 7/2019 | Jetzler et al. | |
| 2009/0257106 A1* | 10/2009 | Tan | G02B 27/48 |
| | | | 359/279 |
| 2012/0105855 A1 | 5/2012 | Miyasaka et al. | |
| 2015/0198438 A1* | 7/2015 | Hetzler | G01B 11/2441 |
| | | | 356/458 |
| 2017/0343449 A1 | 11/2017 | Stiepan et al. | |
| 2018/0087891 A1* | 3/2018 | Wegmann | G03F 7/7085 |
| 2018/0106591 A1 | 4/2018 | Hetzler et al. | |

FOREIGN PATENT DOCUMENTS

| | | |
|---|---|---|
| JP | 201298548 A1 | 5/2012 |
| WO | 2016128234 A1 | 8/2016 |
| WO | 2016188620 A2 | 12/2016 |
| WO | 2020244937 A1 | 12/2020 |

OTHER PUBLICATIONS

Anatoliy Lapchuk et al., "Full speckle suppression in laser projectors using two Barker code-type diffractive optical elements", Jan. 2013, Optical Society of America, vol. 30, No. 1 (Year: 2013).*
M. Nadeem Akram et al., "Speckle reduction methods in laser-based picture projectors", Dec. 2015, Optical Society of Japan, 23:108-120 (Year: 2015).*
International Search Report, PCT/EP2020/057241, Jun. 18, 2020, 6 pages.
Thompson, et al., "Validation of the corrective optics on the Hubble Space Telescope 1str Servicing Mission", Journal of Astronomical Telescopes, Instruments, and Systems, Society of Photo-Optical Instrumentation Engineers, vol. 2, No. 3, Jul. 1, 2016, 10 pages.
Feng, et al., "Design of twin computer-generated hologram for absolute testing of aspheric surfaces", SPIE, International Society for Optical Engineering, vol. 9282, Sep. 18, 2014, 8 pages.
German Office Action with English translation, Application No. DE102019204096, Nov. 11, 2019, 12 pages.
International Preliminary Report on Patentability and the Written Opinion, PCT/EP2020/057241, Sep. 28, 2021, 8 pages.

* cited by examiner

MEASUREMENT METHOD FOR INTERFEROMETRICALLY DETERMINING A SURFACE SHAPE

CROSS REFERENCE TO RELATED APPLICATIONS

This is a Continuation of International Application PCT/EP2020/057241, which has an international filing date of Mar. 17, 2020, and the disclosure of which is incorporated in its entirety into the present Continuation by reference. In addition, the present Continuation claims the benefit of and priority to German patent application 10 2019 204 096.9, filed Mar. 26, 2019. The entire content and disclosure of this German patent application is also incorporated by reference into the present Continuation.

FIELD OF THE INVENTION

The invention relates to a measurement method and to a measurement arrangement for interferometrically determining a shape of an optical surface of a test object. The invention also relates to a method for designing phase gratings. For example, a microlithographic optical element is measured as the test object. As a result of the need for ever smaller structures, ever higher demands are placed on the optical properties of optical elements used in microlithography. The optical surface shape of these optical elements must therefore be determined with the highest possible accuracy.

BACKGROUND

For high-precision interferometric measurement of optical surfaces down to the sub-nanometer range, interferometric measurement arrangements and measurement methods are known, for example from WO 2016/188620 A2, in which a diffractive optical element generates a test wave and a reference wave from an input wave. The wavefront of the test wave can be adapted to a desired surface of the test object by the diffractive optical element such that it would be normally incident on the desired shape at every location and would be reflected back on itself. With the aid of the interferogram formed by the superposition of the reflected test wave and the reference wave, deviations from the desired shape of the test object can then be determined.

One problem with these known measurement arrangements and measurement methods is that measurement errors are caused by the diffractive optical element, as a result of which the measurement accuracy when determining the surface shape is reduced.

SUMMARY

It is an object of the invention to provide a measurement method and a measurement arrangement of the type mentioned in the introductory part, with which the aforementioned problems are addressed and/or solved. It is a further object to improve the measurement accuracy when determining the surface shape with such a measurement method and such a measurement arrangement.

According to one formulation, the abovementioned object is achieved according to one aspect of the invention, for example, with a measurement method, described below, for interferometrically determining a shape of a surface of a test object. The measurement method comprises arranging a first diffractive optical element in the beam path of an input wave for generating a first test wave having a wavefront that is at least partially adapted to a desired shape of the optical surface, capturing a first interferogram generated by the first test wave after interaction with the surface of the test object and arranging a further diffractive optical element in place of the first diffractive optical element in the beam path of the input wave for generating a further test wave having a wavefront that is at least partially adapted to the desired shape of the optical surface, wherein the first diffractive optical element and the further diffractive optical element differ in the configuration of respective diffraction structures. Furthermore, the measurement method comprises capturing a further interferogram generated by the further test wave after interaction with the surface of the test object and determining the shape of the surface of the test object by way of computationally combining the two interferograms. In other words, the two interferograms are not generated simultaneously, but one after the other. The first diffractive optical element and the second diffractive optical element differ in their diffraction effect, i.e. they are not configured identically.

The invention is associated with a recognition that within the measurement arrangement, disturbance radiation can arise, which falsifies the interferogram at one or more disturbance points. Such disturbance radiation can thus be generated at specific locations of the diffractive optical element, which in this text are also referred to as disturbance starting points. Disturbance radiation generated at a diffractive optical element is also referred to below as a disturbance wave. Disturbance waves whose respective propagation direction corresponds to the propagation direction of the test wave and whose respective wavefront differs from the wavefront of the test wave can be generated in this case. Furthermore, disturbance waves can be generated at the diffractive optical element, the propagation direction of which differs from the propagation direction of the test wave, but which nevertheless generate disturbance points in the interferogram, possibly due to a further deflection at the diffractive optical element. In addition, disturbance waves can also be generated by direct reflection at the diffractive optical element. Furthermore, disturbance radiation can arise independently of the diffractive optical element due to reflection paths in a measurement arrangement used to carry out the measurement method. Such reflection paths can arise, for example, from double reflections at lens elements.

By arranging a further diffractive optical element according to the invention in the beam path of the input wave and capturing a further interferogram generated therewith, it becomes possible to at least largely computationally remove the measurement errors generated by the disturbance radiation and thus to improve the measurement accuracy when determining the surface shape.

According to a further embodiment, the two diffractive optical elements differ at least in that line densities of respective diffraction structures corresponding to the same location on the test object between the two diffractive optical elements differ by at least 10 lines per millimeter. In other words, the line density of respective diffraction structures of the first diffractive optical element corresponding to the same location on the test object is at least 10 lines per millimeter greater or smaller than the line density of the further diffractive optical element. According to a further embodiment, the two diffractive optical elements differ at least in that line densities of respective diffraction structures corresponding to the same location on the test object between the two diffractive optical elements differ by at least 100 lines per millimeter.

According to a further embodiment, the measurement method is carried out with a measurement arrangement, which comprises a radiation source for providing the input wave, a first holding device for respectively holding one of the two diffractive optical elements, and a second holding device for holding the test object, wherein a configuration of the measurement arrangement is changed after the capturing of the first interferogram and the further interferogram is captured in the changed configuration. This means that the two interferograms are captured in different configurations of the measurement arrangement.

According to a further embodiment, during the changing of the configuration of the measurement arrangement, a changed relative position between the relevant diffractive optical element and the test object is set by manipulating at least one of the holding devices. The manipulation comprises a corresponding adjustment of at least one of the holding devices; this adjustment can be carried out manually or automatically.

According to a further embodiment, the change in the relative position comprises a change in the relative tilt position between the relevant diffractive optical element and the test object. According to one embodiment variant, the change in the relative tilt position comprises tilting the relevant diffractive optical element, in particular about a tilt axis arranged transversely to the propagation direction. According to a further embodiment variant, the change in the relative tilt position comprises tilting the test object. When computationally combining the two interferograms, according to one embodiment, the deformation of the surface of the test object resulting from the tilting of the test object and the associated change in the beam path in the measurement arrangement are modeled. This can be done with finite element modeling.

According to a further embodiment, the change in the relative position comprises a translational movement between the relevant diffractive optical element and the test object. In particular, the translational movement comprises a displacement of the test object, i.e. the second holding device is manipulated such that the test object executes a translational movement.

According to a further embodiment, the measurement arrangement comprises a reference element for reflecting a reference wave decoupled from the input wave, wherein the reference element is tilted when the configuration of the measurement arrangement is changed. The reference element can be a mirror for back reflection of a reference wave decoupled from the input wave at the corresponding diffractive optical element. Furthermore, the reference element can also be what is known as a Fizeau element, which is configured to decouple the reference wave from the input wave by reflection. The respective reference wave is superimposed with the corresponding test wave to generate the corresponding interferogram. The tilting takes place in particular about a tilting axis arranged transversely to the beam path of the input wave. In the case in which the reference wave is decoupled from the input wave at the diffractive optical element, the tilting takes place in particular furthermore about a tilting axis that is arranged transversely to the plane that is defined by the propagation direction of the input wave and the propagation direction of the reference wave after it is decoupled at the diffractive optical element.

According to a further embodiment, the measurement arrangement comprises a deflection mirror for deflecting the input wave before it is incident on the relevant diffractive optical element, wherein the deflection mirror is tilted when the configuration of the measurement arrangement is changed. In the case in which the reference wave is decoupled from the input wave at the diffractive optical element, the tilting takes place in particular about a tilting axis that is arranged transversely to the plane that is defined by the propagation direction of the input wave and the propagation direction of the reference wave after it is decoupled at the diffractive optical element.

According to a further embodiment, a wavelength of the input wave is changed when the configuration of the measurement arrangement is changed.

According to a further embodiment, the diffractive optical elements each have at least two diffractive structure patterns that are arranged so as to superpose one another. One of the diffractive structure patterns can be designed to generate the test wave and the other diffractive structure pattern can be designed to generate the reference wave. Such a diffractive optical element with at least two superposed diffractive structure patterns can comprise a complex coded phase grating.

The abovementioned object can furthermore be achieved according to a further aspect of the invention with a measurement arrangement for interferometrically determining a shape of a surface of a test object. The measurement arrangement comprises a radiation source for providing an input wave, a first holding device for arranging a first diffractive optical element, and, alternatively, a further diffractive optical element in the beam path of the input wave for generating a respective test wave, a second holding device for holding the test object in the beam path of the respective test wave, and an evaluation device which is configured to determine the shape of the surface of the test object by computationally combining a first interferogram, which is generated when the first diffractive optical element is arranged in the beam path of the input wave, with a further interferogram, which is generated when the further diffractive optical element is generated in the beam path of the input wave.

As described above, the further interferogram is generated when the further diffractive optical element is arranged in the beam path of the input wave. The arrangement of the further diffractive optical element in the beam path of the input wave takes place here in place of the first diffractive optical element. The two interferograms are generated with the test wave generated by the respective diffractive optical element after interaction with the surface of the test object. The respective test wave in each case has a wavefront that is at least partially adapted to a desired shape of the optical surface.

The features specified in respect of the embodiments, exemplary embodiments, and embodiment variants, etc. of the measurement method according to the invention, listed above, can be accordingly transferred to the measurement arrangement according to the invention. These and other features of the embodiments according to the invention are explained in the description of the figures and in the claims. The individual features can be implemented, either separately or in combination, as embodiments of the invention. Furthermore, they can describe advantageous embodiments which are independently protectable and protection for which is claimed if appropriate only during or after pendency of the application.

Furthermore, according to another aspect of the invention, a method for designing phase gratings is provided, which comprises generating a multiplicity of different designs of a phase grating, each of which is configured to generate a test wave from an input wave radiated onto the phase grating, on the basis of specified boundary conditions. Furthermore, the design method according to the invention comprises determining positions of disturbance points for each of the generated designs that are contained in an interferogram corresponding to the respective design, wherein the respective interferogram can be generated in a measurement device by the test wave assigned to the respective design. Furthermore, the design method according to the invention comprises identifying disturbance points in the same position in the interferograms of in each case at least two of the generated designs, and selecting a combination of at least two of the generated designs, taking into account the number of disturbance points in the same position in comparison with other combinations. Disturbance points occur due to disturbance radiation, which, at the corresponding disturbance point, has a wavefront that differs there from the test wave. The positions of disturbance points in the corresponding interferogram are determined on the basis of a simulation and/or experimentally.

In particular, that combination of at least two of the generated designs is selected whose number of disturbance points in the same position is lower than the number of disturbance points in the same position in other combinations. For example, the combination of at least two of the generated designs can be selected such that the number of disturbance points in the same position becomes minimal. In other words, in this embodiment, the number of disturbance points in the same position is lower in the selected combination than in all other combinations.

According to one embodiment, the combination of at least two of the generated designs can be selected such that the number of disturbance points in the same position falls below a specified threshold value.

According to a further embodiment of the design method, at least one of the disturbance points of one of the generated designs is generated by a disturbance wave that is generated at a point of the phase grating assigned to the disturbance point in addition to the test wave from the input wave, whose propagation direction corresponds to the propagation direction of the test wave and whose wavefront differs from the wavefront of the test wave. In particular, all disturbance points of the generated designs are generated by a respective disturbance wave of this type. The point of the phase grating assigned to the disturbance point of the interferogram is also referred to in this text as the disturbance starting point.

The statement that the propagation direction of the disturbance wave coincides with the propagation direction of the test wave is to be understood as meaning that the propagation directions differ so slightly from one another that, when using a diffractive element manufactured using the relevant design for interferometric surface shape determination, the disturbance wave is incident on the corresponding location in the interferogram generated by the test wave and thus falsifies a measurement at this location that is based solely on this interferogram.

According to one embodiment of the design method, the designs relate to complex coded phase gratings and each have at least two diffractive structure patterns arranged so as to superpose one another. The different designs are to be understood as meaning that the designs differ from one another in each case in the configuration of at least one of the structure patterns.

According to a further embodiment of the design method, due to an interaction of the input wave with the diffractive structure patterns, which is of a different type than when generating the test wave, the disturbance wave has the wavefront differing from the wavefront of the test wave. In particular, the disturbance wave has a phase shift with respect to the test wave. This means that the interaction of the input wave with the at least two superimposed diffractive structure patterns is different when generating the disturbance wave than when generating the test wave. According to one embodiment, the diffractive structure patterns are involved in the generation of the disturbance wave with a different weighting than in the generation of the test wave, wherein the weighting can also be zero.

For example, in the case of a design with two superposed structure patterns, a test wave can be generated with the +1 order of diffraction at the first structure pattern. A disturbance wave with the same propagation direction can then be formed, for example, by superimposing a wave generated with the +2 order of diffraction at the first structure pattern with a wave generated with the −1 order of diffraction at the second structure pattern.

According to another example, in the case of a design with three mutually superposed structure patterns, a test wave can likewise be generated with the +1 order of diffraction at the first structure pattern. A disturbance wave with the same propagation direction can then be formed, for example, by superimposing the wave generated with the +1 order of diffraction at the first structure pattern with a wave generated with the −1 order of diffraction at the second structure pattern and also with a wave generated with the +1 order of diffraction at the third structure pattern.

According to one embodiment, the disturbance wave has an intensity that is at least $10^{-6}$, in particular at least $10^{-5}$, at least $10^{-4}$, at least $10^{-3}$ or at least $10^{-2}$ the intensity of the test wave.

According to a further embodiment of the design method, an error budget characterizing wavefront errors of the test wave caused by known manufacturing inaccuracies is calculated for each of the generated designs and the calculated error budgets of the generated designs are also taken into account when selecting the combination of at least two of the generated designs. The known manufacturing inaccuracies relate to the manufacturing inaccuracies of a phase grating manufactured on the basis of the relevant design. In particular, the objective of minimizing the number of disturbance points in the same position is weighed against the objective of keeping the error budgets of the selected designs as small as possible. This can take place, for example, using an optimization calculation based on a suitable target function.

According to one embodiment of the measurement method according to the invention, the diffractive optical elements comprise phase gratings, the designs of which are determined via the design method in one of the embodiments described above. In particular, the measurement method comprises the limitations of the design method for determining a combination of at least two designs of phase gratings, wherein these designs are used to manufacture the first diffractive optical element and the further diffractive optical element.

BRIEF DESCRIPTION OF THE DRAWINGS

The above and further advantageous features of the invention are illustrated in the following detailed description of exemplary embodiments according to the invention with reference to the accompanying schematic drawings. In the drawings.

DETAILED DESCRIPTION

In the exemplary embodiments or embodiments or embodiment variants described below, elements which are functionally or structurally similar to one another are provided with the same or similar reference signs as far as possible. Therefore, for understanding the features of the individual elements of a specific exemplary embodiment, reference should be made to the description of other exemplary embodiments or the general description of the invention.

Figure 1:
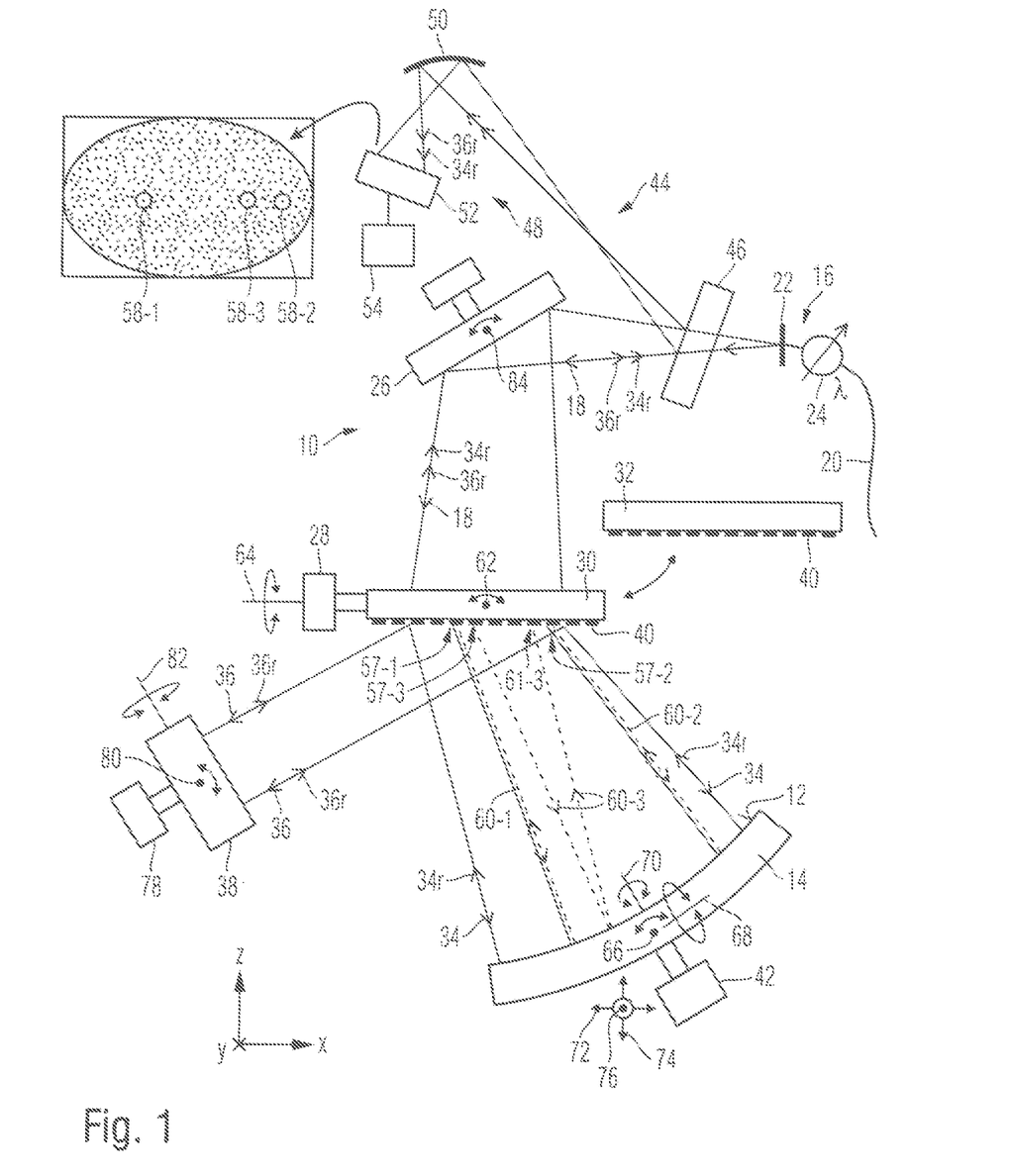
FIG. 1 shows a first exemplary embodiment of a measurement arrangement according to the invention for interferometrically determining a shape of an optical surface of a test object with a first embodiment of a diffractive optical element for generating a test wave and a reference wave.

In order to facilitate the description, a Cartesian xyz-coordinate system is indicated in the drawing, from which system the respective positional relationship of the components illustrated in the figures is evident. In FIG. 1, the y-direction extends perpendicularly to the plane of the drawing into said plane, the x-direction extends toward the right, and the z-direction extends upward.

FIG. 1 illustrates an exemplary embodiment of a measurement arrangement 10 for interferometrically determining the shape of an optical surface 12 of a test object 14. The measurement arrangement 10 can be used, in particular, to determine a deviation of the actual shape of the surface 12 from a desired shape. The test object 14 provided can be, for example, a mirror of a projection lens for EUV microlithography having a non-spherical surface for reflecting EUV radiation at a wavelength of less than 100 nm, in particular a wavelength of approximately 13.5 nm or approximately 6.8 nm. The non-spherical surface of the mirror can have a free-form surface with a deviation from each rotation-symmetric asphere of more than 5 μm and a deviation from each sphere of at least 1 mm.

The measurement arrangement 10 contains a radiation source 16 for providing a sufficiently coherent measurement radiation as the input wave 18. In this exemplary embodiment, the radiation source 16 comprises a waveguide 20 having an exit surface 22. The waveguide 22 is connected to a radiation generation module (not shown in FIG. 1), for example in the form of a laser. By way of example, provision to this end can be made of a helium-neon laser with a wavelength of approximately 633 nm. However, the illumination radiation may also have a different wavelength in the visible or non-visible wavelength range of electromagnetic radiation. In one embodiment, the wavelength of the radiation source 16 can be changed, which is illustrated in FIG. 1 by way of a wavelength adjustment controller 24. The radiation source 16 with the waveguide 20 represents merely an example of a radiation source that can be used for the measurement arrangement. In alternative embodiments, rather than the waveguide 20, an optical arrangement with lens elements, mirror elements or the like can be provided for providing a suitable input wave 18.

The measurement arrangement 10 furthermore comprises a deflection mirror 26 and a first holding device 28. The deflection mirror 26 serves to deflect the input wave 18 onto a diffractive optical element held by the first holding device 28. In the illustration according to FIG. 1, this is a first diffractive optical element denoted by the reference sign 30. This first diffractive optical element 30 can be removed from the holding device 28 and instead a second diffractive optical element 32 or a further diffractive optical element can be arranged in the holding device 28.

The corresponding diffractive optical element held by the holding device 28, the diffractive optical element 30 in the illustration according to FIG. 1, is used to generate a test wave 34 and a reference wave 36 from the input wave 18. Furthermore, the measurement arrangement 10 comprises a reference element 38 designed as a reflective optical element for reflecting the reference wave 36 into a returning reference wave 36r. The reference element 38 is attached to a third holding device 78.

Figure 3:
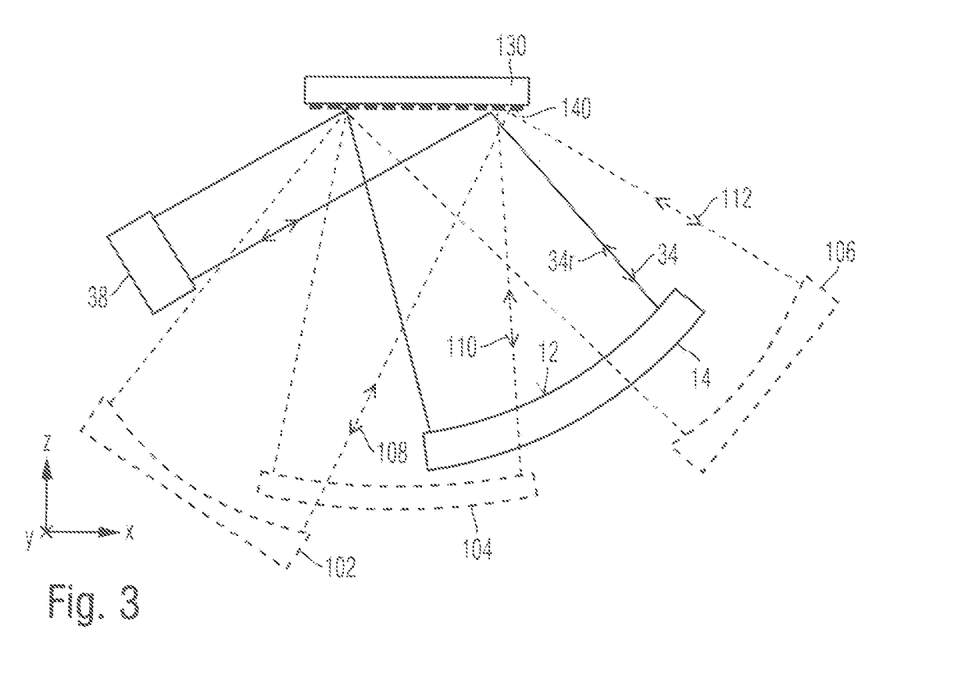
FIG. 3 shows a further embodiment of a diffractive optical element for use in the measurement arrangement according to FIG. 1 with additional calibration mirrors.

The diffractive optical element 30 is designed in the form of a complex coded CGH and contains diffractive structures 40, which, according to the embodiment illustrated in FIG. 1, form two diffractive structure patterns that are arranged mutually superposed in a plane. The diffractive optical element 30 according to FIG. 1 is therefore also referred to as a twice complex coded computer-generated hologram (CGH). Alternatively, the diffraction structures could also form more than two diffractive structure patterns arranged mutually superposed in a plane, for example five diffractive structure patterns arranged mutually superposed, as explained in more detail below with reference to FIG. 3. The diffractive optical element 130 according to FIG. 3 is therefore also referred to as a five-times complex coded CGH.

The two diffractive structure patterns of the diffractive optical element 30 according to FIG. 1 can be formed, for example, by a first structure pattern in the form of a bottom grating and a second diffractive structure pattern in the form of a top grating. One of the diffractive structure patterns is configured to generate the test wave 34, which is directed onto the test object 14 held by a second holding device 42 and is configured with a wavefront that is at least partially adapted to a desired shape of the optical surface 12. The test wave 34 is reflected at the optical surface 12 of the test object 14 and returns to the diffractive optical element 30 as a returning test wave 34r. Due to the wavefront that is adapted to the desired shape of the optical surface 12, the test wave 34 is substantially normally incident at every location on the optical surface 12 and is reflected back on itself.

The other diffractive structure pattern generates the reference wave 36, which is directed onto the reference element 38 and has a plane wavefront. In alternative exemplary embodiments, a simply coded CGH with a diffractive structure or another optical grating can be used instead of the complex coded CGH. The test wave 34 can for example be generated in a first order of diffraction, and the reference wave 36 can be generated in the zero or any other order of diffraction at the diffractive structure. The reference element 38 is designed in the form of a plane mirror for back-reflection of the reference wave 36 with a plane wavefront. In another embodiment, the reference wave 36 can have a spherical wavefront, and the reference element 38 can be designed as a spherical mirror.

The test wave 34r returning from the surface 12 passes through the diffractive optical element 30 again and is diffracted again in the process. In this case, the returning test wave 34r is transformed back into an approximately spherical wave, wherein the wavefront thereof has corresponding deviations from a spherical wavefront due to deviations of the surface 12 of the test object from the desired shape. The returning reference wave 36r reflected by the reference element 38 also passes through the diffractive optical element 30 again and is again diffracted in the process. In this case, the returning reference wave 36r is transformed back into a spherical wave. In an alternative embodiment with a collimator in the beam path of the input wave 18 for generating an input wave 18 with a plane wavefront, the wavefront of the reference wave 36r does not need to be adapted with the diffractive optical element 30.

The diffractive optical element 30 therefore also serves for superimposing the returning test wave 34r with the returning reference wave 36r. The measurement arrangement 10 furthermore contains a capturing device 44 having a beam splitter 46 for guiding the combination of the returning test wave 34r and the returning reference wave 36r out of the beam path of the input wave 18, and an interferometer camera 48 for capturing an interferogram generated by superimposing the test wave 34r with the reference wave 36r.

The returning test wave 34r and the returning reference wave 36r are incident on the beam splitter 46 as convergent beams and are reflected thereby in the direction of the interferometer camera 48. Both convergent beams pass through an eyepiece 50 of the interferometer camera 48 and are finally incident on a two-dimensionally resolving detector 52 of the interferometer camera 48. In the present embodiment, in which the radiation source 16 is provided with a wave adjustment controller 24, the eyepiece 50 is configured as a mirror. In alternative embodiments, in which no adjustability of the wavelength is provided, the eyepiece can also be configured as a lens element. The detector 48 can be designed, for example, as a CCD sensor and captures an interferogram generated by the interfering waves. In the focus of the convergent beams of the waves 34r and 36r, a stop (not shown in FIG. 1) can be arranged as a spatial filter for reducing stray radiation.

Furthermore, the measurement arrangement 10 comprises an evaluation device 54 for determining the actual shape of the optical surface 12 of the test object 14 from at least two interferograms recorded with the detector 48. First, a first interferogram, which is generated when the first diffractive optical element 30 is arranged at the first holding device 28 on the detector 48, with at least one further interferogram, which is generated with the arrangement of the second diffractive optical element 32 and, if necessary, of further diffractive optical elements at the first holding device 28 on the detector 48, described in more detail below, are computationally combined. The evaluation device 54 then determines the actual shape of the optical surface 12 from the computationally combined interferograms. Alternatively or additionally, the measurement apparatus 10 can contain a data memory or an interface with a network to make possible a determination of the surface shape using the interferograms that are stored or transmitted via the network with an external evaluation unit.

The interferograms recorded by the detector 48 typically have disturbance point distributions. FIG. 1 shows an example of such a disturbance point distribution 56-1 for the first interferogram recorded with the first diffractive optical element 30. The black-coloured point-like regions mark disturbance points 58 in the interferogram. Disturbance points 58 occur due to disturbance radiation, which, at the corresponding disturbance point 58, has a wavefront that differs there from the test wave 34.

The disturbance radiation responsible for the disturbance points 58 can be generated at the diffractive optical element 30, in which case the disturbance radiation is referred to as disturbance wave 60 in this text.

A first category of disturbance waves 60 is illustrated in FIG. 1 with the aid of two disturbance starting points 57-1 and 57-2. The disturbance starting points 57-1 and 57-2 are understood to mean positions on the diffractive optical element 30 at which in each case a disturbance wave 60 (in the example disturbance waves 60-1 and 60-2), whose respective propagation direction corresponds to the propagation direction of the test wave 34 and whose respective wavefront differs from the wavefront of the test wave 34, is generated in addition to the test wave 34, which is directed onto the optical surface 12, from the input wave 18.

At the disturbance points 58-1 and 58-2, i.e. the locations of the interferogram recorded by the detector 48 which correspond to the disturbance starting points 57-1 and 57-2, three waves are superposed rather than the desired superposition of only the test wave 34r and the reference wave 36r, to be precise the test wave 34r, the reference wave 36r, and the respective disturbance wave 60-1 or 60-2. Due to the contribution of the disturbance wave 60 to the intensity measured at the corresponding location of the interferogram, the measurement at this location is falsified, i.e. the measurement at this location is unusable. Therefore, the disturbance points can also be referred to as "blind spots." Depending on the accuracy requirement, a measurement is deemed unusable as soon as the intensity of the corresponding disturbance wave 60 is at least $10^{-6}$, in particular at least $10^{-5}$, at least $10^{-4}$, at least $10^{-3}$ or at least $10^{-2}$ the intensity of the test wave 34r at the location mentioned.

According to one embodiment, one or more of the disturbance waves 60 can arise due to an interaction of the input wave 18 with the diffractive structure patterns of the diffraction structures 40 at the disturbance points 58, which is of a different type than when the test wave 34 was generated. With reference to the twice complex coded CGH according to FIG. 1, a disturbance wave 60 can be generated for example at one or more disturbance points 58, at which, as at all other locations of the diffraction structures 40, the test wave 34 is generated with the +1 order of diffraction at the first structure pattern (no diffraction or 0 order of diffraction at the second structure pattern), with a suitable configuration of the structure patterns by diffraction of the input wave 18 at the first structure pattern in the +2 order of diffraction and simultaneous diffraction at the second structure pattern in the −1 order of diffraction. As mentioned above, such a disturbance wave has the same propagation direction but a different wavefront than the test wave 34.

A second category of disturbance waves 60, i.e. disturbance radiation arising at the diffractive optical element 30, is shown by way of example in FIG. 1 as a disturbance wave 60-3 emanating from a disturbance starting point 57-3. In contrast to the disturbance waves 60-1 and 60-2, the disturbance wave has a propagation direction that differs from the propagation direction of the test wave 34 in the corresponding radiation path. After reflection at the optical surface 12 of the test object 14, the disturbance wave 60-3 therefore returns to the diffractive optical element 30 on a tilted path and is thus incident on the diffractive optical element 30 at a point 61-3, which differs from the disturbance starting point 57-3. At this point, which is also referred to as disturbance wave deflection point 61-3, the disturbance wave 60-3 is usually deflected differently than is the case for the returning test wave 34r at this point, to be precise such that the disturbance wave 60-3 in its further course remains within the beam path extending via the deflection mirror 26, the beam splitter 46 and the eyepiece 50 up to the detector 52. In the exemplary illustration according to FIG. 1, the disturbance wave 60-3 is incident on the detector 52 at the location of the disturbance point 58-3.

According to a third category, disturbance radiation arising at the diffractive optical element 30 can come about in the form of disturbance waves through direct reflection of the input wave 18 at the diffractive optical element 30. According to a further embodiment variant, disturbance radiation generating disturbance points in the interferogram can also be formed independently of the diffractive optical element on the basis of reflection paths within the measurement arrangement 10. Such reflection paths are particularly relevant in measurement arrangements that, in addition to mirrors, also comprise one or more lens elements at which double reflections can occur.

In the embodiment illustrated in FIG. 3, in which the diffractive optical element 130 is configured as a five-times complex coded CGH, a multiplicity of combinations of orders of diffraction for generating disturbance waves 60 are feasible. According to one example, disturbance waves 60 can be generated by diffraction of the input wave 18 at the first structure pattern in +1 order of diffraction and simultaneous diffraction at the third structure pattern in −1 order of diffraction and also at the fourth structure pattern in +1 order of diffraction (no diffraction at the fourth and fifth structure patterns, i.e. in brief: [1, 0, −1, 1, 0]).

In general, disturbance radiation, as described above with reference to FIG. 1, can also be generated in the form of disturbance waves with a propagation direction that differs from the propagation direction of the test wave 34, in the form of disturbance waves reflected directly at the diffractive optical element, or in the form of disturbance radiation caused by reflection paths within the measurement arrangement.

As mentioned above, at least two interferograms are computationally combined in order to determine the actual shape of the optical surface 12 of the test object 14. For this purpose, after the above-described recording of the first interferogram generated by the first diffractive optical element 30, the second diffractive optical element 32 is arranged first in place of the first diffractive optical element 30 in the beam path of the input wave 18. In other words, the first diffractive optical element 30 is removed from the holding device 28, and the second diffractive optical element 32 is arranged at the holding device 28.

The second diffractive optical element 32 is very similar to the first diffractive optical element 30, but differs to a certain extent in the configuration of its diffraction structures 40. The diffraction structures 40 of the second diffractive optical element 32 likewise comprise two diffractive structure patterns, wherein the first structure pattern is configured to generate the test wave 34 with a wavefront that is at least partially adapted to the desired shape of the optical surface 12 and the second diffractive structure pattern is configured to generate the reference wave 36. The test wave 34 and reference wave 36 generated by the second diffractive optical element 32 differ only slightly in their propagation directions from the corresponding waves 34 and 36 generated by the first diffractive optical element 30. Here, the waves that are associated with the same points on the optical surface 12 of the test object 14 or the reference element 38 are in each case compared with one another. In other words, the propagation directions of the test waves 34 and/or of the reference waves 36 differ slightly from one another, i.e. the corresponding emission angle of the test wave 34, the reference wave 36 or both waves 34 and 36 from the corresponding diffractive optical element 30 or 32 differs slightly. According to one embodiment, the difference in the propagation directions is at least 0.3°, in particular at least 3°. As an alternative or in addition to the change in the emission angle with respect to the test wave 34 and the reference wave 36, the change brought about by the second diffractive optical element 32 can also relate to a rotation of the test wave 34 about its propagation direction.

Due to the changed emission behavior of the second diffractive optical element 32, the configuration of the measurement arrangement 10 is adapted to the changed beam path before the corresponding interferogram is captured. This can be accomplished with one or more of the configuration changes of the measurement arrangement 10 described below. For this purpose, the first holding device 28 is configured to change the tilt position of the diffractive optical element 30 or 32 about two tilt axes 62 and 64, which are orthogonal to one another and are aligned transversely to the direction of irradiation of the input wave 18.

Furthermore, the second holding device 42 is configured to move the test object 14 in all six rigid body degrees of freedom, i.e. to change the tilt position of the test object 14 by three mutually orthogonal tilt axes 66, 68 and 70 and to displace the test object 14 along three orthogonally aligned translation directions 72, 74 and 76. Furthermore, the third holding device 78 is configured to change the tilt position of the reference element 38 by two tilt axes 80 and 82, which are orthogonal to one another and are aligned transversely to the direction of irradiation of the reference wave 36. Furthermore, the deflection mirror 26 is arranged to be tiltable about at least one tilt axis 84 aligned perpendicularly to the direction of irradiation of the input wave 18.

As already mentioned above, the radiation source 16 is provided with a wave adjustment controller 24. By changing the wavelength of the input wave 18, the emission angles of the waves 34 and 36 from the diffractive optical elements 30 and 32 can be changed and a deviation between the diffractive optical elements 30 and 32 relating to these emission angles can be compensated. A change in the wavelength therefore likewise falls under the aforementioned possible configuration changes of the measurement arrangement 10.

The configuration changes that can be brought about through the tilt and translational degrees of freedom described above comprise the setting of a changed relative position, in particular by changing the relative tilt position and/or performing a translational movement, between the diffractive optical element 30 or 32 and the test object 14. These configuration changes can furthermore include tilting the reference element 38 and/or the deflection mirror 26.

Figure 2:
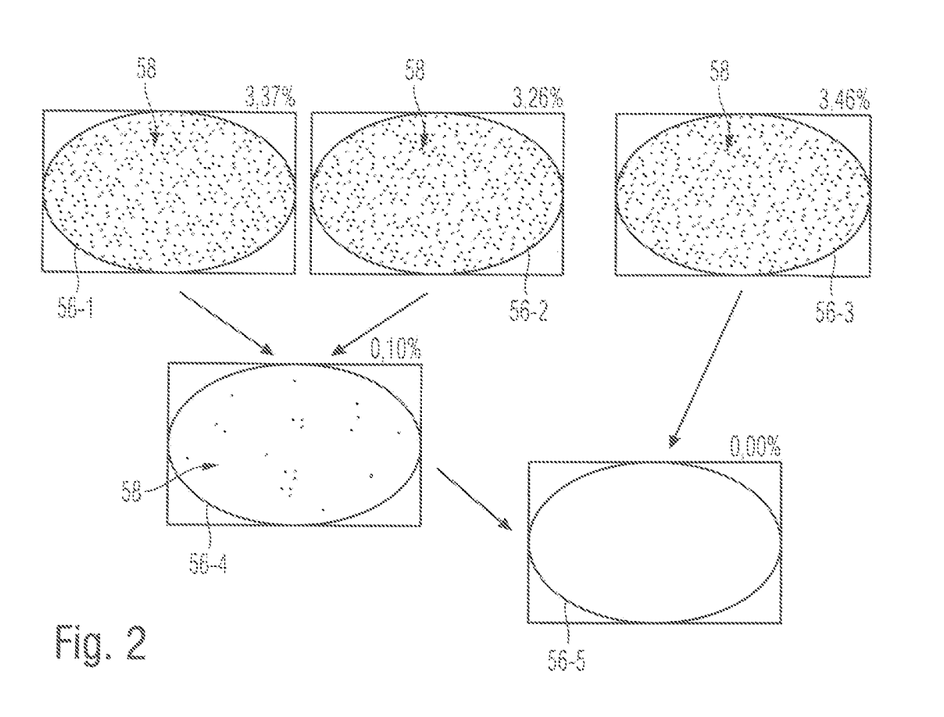
FIG. 2 shows disturbance point distributions of interferograms recorded with the measurement arrangement according to FIG. 1.

The example of a disturbance point distribution 56-1 of an interferogram recorded by the detector 48 via the first diffractive optical element 30, which was already shown in FIG. 1, is shown at the top left in FIG. 2. As already indicated above, the disturbance points contained therein are not points in the mathematical sense but rather point-like regions. The area cumulatively occupied by the disturbance points 58 in the disturbance point distribution 56-1 is 3.37% of the total area of the interferogram in the present example, i.e. the proportion of disturbance points is 3.37%.

In addition to the disturbance point distribution 56-1, FIG. 2 shows an example of a disturbance point distribution 56-2 of a second interferogram recorded, as described above, via the second diffractive optical element 32 with a corresponding change in the configuration of the measurement arrangement 10. The disturbance point proportion of the second interferogram is 3.26% in the present example. The disturbance points 58 in the second interferogram are, however, distributed differently than in the first interferogram, meaning that the combination of the two interferograms results in a disturbance point distribution 56-4 with a disturbance point proportion, i.e. a proportion of "blind spots," of only 0.10%.

Furthermore, FIG. 2 illustrates the case in which a third interferogram is also recorded via a third diffractive optical element, which differs to a certain extent from the first two diffractive optical elements 30 and 32 according to the criteria explained above, with a corresponding change in the configuration of the measurement arrangement 10. The disturbance point distribution 56-3 of the third interferogram has a disturbance point proportion of 3.46% in the present example. If all three interferograms are combined, the resulting disturbance point distribution 56-5 results in a disturbance point proportion of less than 0.01%.

The above-described computational combination of a plurality of interferograms to determine the actual shape of the optical surface 12 of the test object 14 reduces the influence of the error due to the disturbance points 58 on the result of the shape determination in accordance with the above-explained reduction in the disturbance point proportion in the combined interferograms. The accuracy of the shape determination is thus improved accordingly.

As already mentioned above, FIG. 3 illustrates a diffractive optical element 130 in the form of a five-times complex coded CGH, which can be used in the measurement arrangement 10 according to FIG. 1 in place of the first diffractive optical element 30 or, in a shape that has changed to a certain extent according to the previously explained criteria, in place of a further diffractive optical element, such as the second diffractive optical element 32. When using the diffractive optical element 130 in the measurement arrangement 10 according to FIG. 1, three calibration mirrors 102, 104 and 106 are additionally provided. To calibrate the diffractive optical element 130 or the measurement arrangement 10, the calibration mirrors 102, 104 and 106 are arranged and measured one after the other in place of the test object 14.

The diffraction structures 140 of the diffractive optical element 130 form five diffractive structure patterns arranged such that they are superposed on one another in a plane. In addition to the test wave 34 directed onto the surface 12 of the test object 14 to be measured and the reference wave 36 directed onto the reference element 38, the diffraction structures 140 generate three calibration waves 108, 110 and 112. The calibration waves 108, 110, 112 are each directed onto one of the calibration mirrors 102, 104 and 106 and, in the present embodiment, are all formed as spherical waves, the wavefront of which is adapted to the shape of the respective calibration mirror. In other embodiments, in addition to or instead of spherical waves, plane waves can also be used as calibration waves.

Using the detector 52, calibration interference patterns generated with the returning reference wave 36r are recorded by superposition of the calibration waves 108, 110 and 112 after their respective reflection at the corresponding calibration mirror 102, 104 and 106. By evaluating the calibration interference patterns, figure and/or placement errors of the diffraction structures 140 of the diffractive optical element 130 can be determined and correspondingly taken into account when determining the shape of the optical surface 12 by evaluating the interferograms generated by superimposition of the returning test wave 34r with the returning reference wave 36r.

Figure 4:
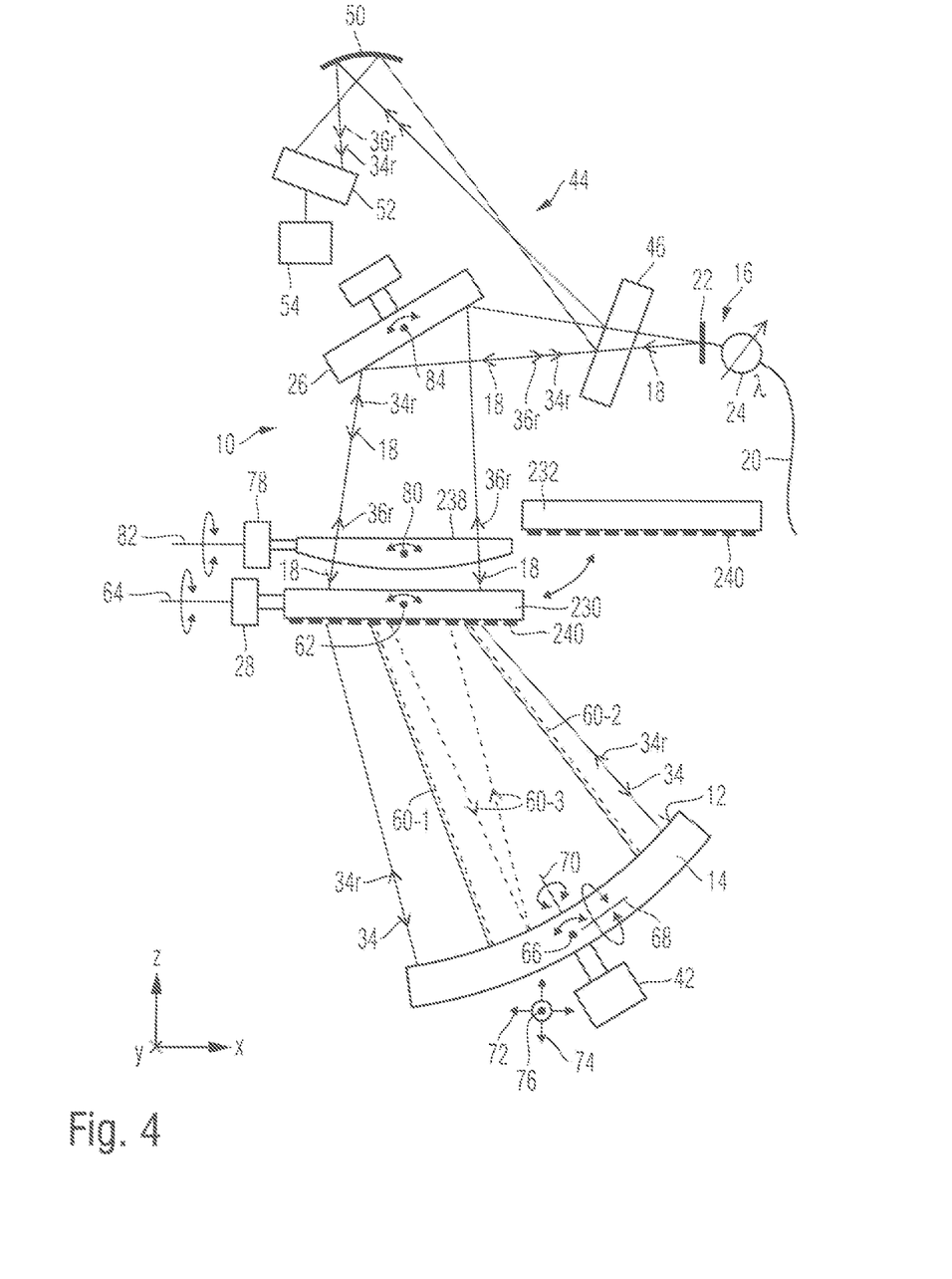
FIG. 4 shows a further exemplary embodiment of a measurement arrangement according to the invention for interferometrically determining a shape of an optical surface of a test object with a diffractive optical element for generating a test wave.

FIG. 4 illustrates a further embodiment of a measurement arrangement 10 for interferometrically determining the shape of an optical surface 12 of a test object 14. The measurement arrangement 10 according to FIG. 4 differs from the measurement arrangement according to FIG. 1 in that, instead of the reference element 38 that is designed as a reflective optical element, a reference element 238 in the form of a Fizeau element is provided and, instead of the diffractive optical element 30 or 32 for generating both the reference wave 36 and the test wave 34, a diffractive optical element 230 or 232 with diffraction structures 240 for generating the test wave 34 is arranged. The Fizeau element is arranged in the beam path of the input wave 18, i.e. upstream of the diffractive optical element 230 or 232, and is configured to reflect part of the radiation from the input wave 18 as a returning reference wave 36r. The measurement arrangement 10 according to FIG. 4 is thus configured as a Fizeau interferometer.

The reference element 238 is attached to the third holding device 78 and can thus be tilted about two tilt axes 80 and 82 which are orthogonal to one another and are aligned transversely to the direction of irradiation of the input wave 18. This tilting must then take place simultaneously with a tilting of the deflection mirror 26 so that the light continues to be normally incident on the Fizeau surface. The mode of operation of the measurement arrangement 10 according to FIG. 4 is analogous to the mode of operation of the measurement arrangement 10 according to FIG. 1, i.e. the interferograms recorded with the two diffractive optical elements 230 and 232 with a change in the configuration of the measurement arrangement 10 are computationally combined to determine the shape of the optical surface 12 of the test object 14. The diffractive optical elements 230 and 232 can in particular be configured as a complex coded CGH and can be designed, for example, analogously to the diffractive optical element 130 shown in FIG. 3, for generating calibration waves in addition to the test wave 34.

Figure 5:
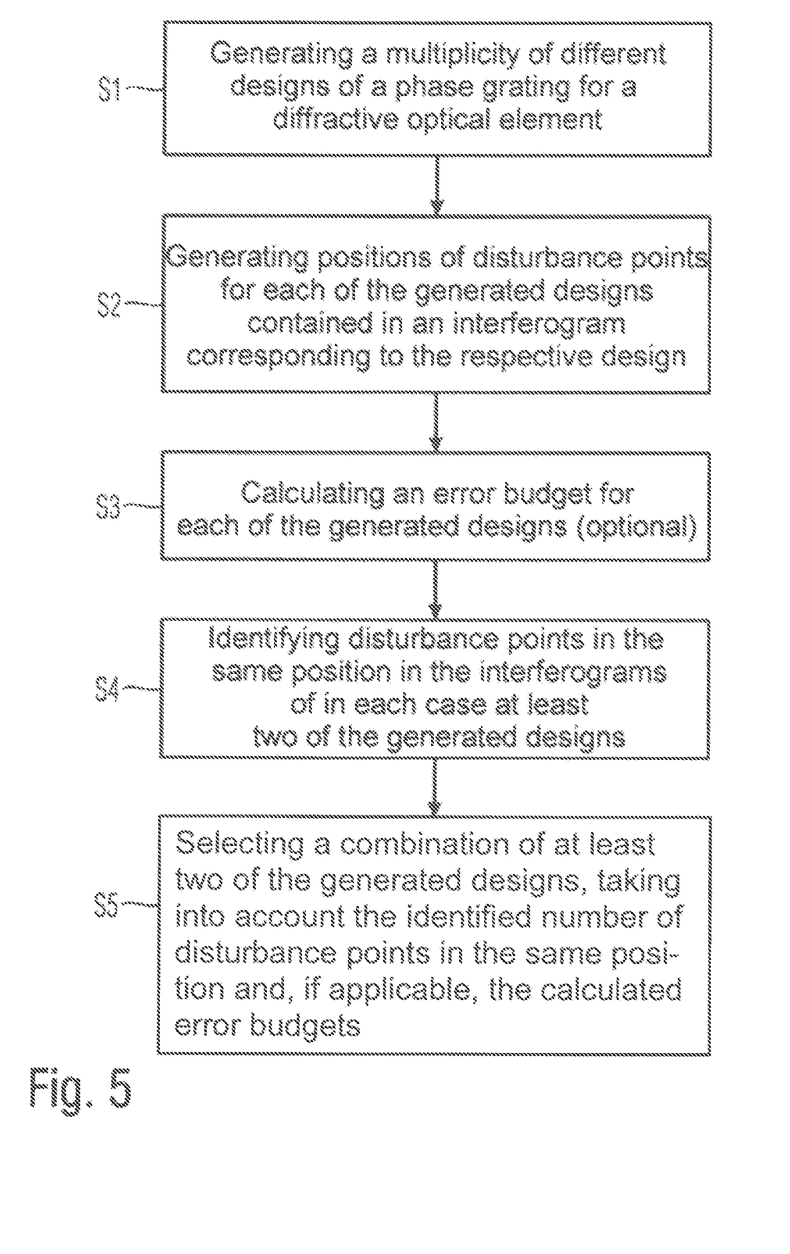
FIG. 5 shows a flowchart for illustrating a method for designing phase gratings for diffractive optical elements for use in the measurement arrangement according to FIG. 1 or FIG. 4.

FIG. 5 illustrates a method for designing the phase gratings for the combination of diffractive optical elements 30 and 32 or 230 and 232 and possibly further diffractive optical elements used by the measurement arrangement 10 according to FIG. 1 or FIG. 4 with the aid of a flowchart. In particular, these are designs of complex coded phase gratings, each of which having at least two mutually superposed diffractive structure patterns. In a first step S1 of the design method, a multiplicity of different designs of a phase grating for a diffractive optical element are generated in a computing device on the basis of specified boundary conditions. The generated phase gratings are each configured to generate the test wave 34 according to FIG. 1 from the input wave 18 radiated onto the phase grating.

In a second step S2 of the design method, positions of disturbance points 58 are generated for each of the generated designs contained in an interferogram corresponding to the respective design, wherein the respective interferogram can be generated in a measurement arrangement 10 with the test wave 34 assigned to the respective design.

In the case of complex coded phase gratings, the disturbance points 58, as described above with reference to FIG. 1 and FIG. 3, can correspond to locations at which waves diffracted in different orders of diffraction at the individual diffractive structure patterns of the phase grating are superposed such that the superposed wave has the same propagation direction as the test wave 34. In other words, at locations 57 of the phase grating corresponding to the disturbance points 58, a respective disturbance wave 60 can be generated which, due to an interaction of the input wave 18 with the diffractive structure patterns, which is of a different type than when generating the test wave 34, has a wavefront that differs from the wavefront of the test wave 34.

In an optional third step S3 of the design method, an error budget characterizing wavefront errors of the test wave 34 caused by known inaccuracies when manufacturing a diffractive optical element based on the respective design is calculated for each of the generated designs.

In a fourth step S4 of the design method, disturbance points in the same position are identified in the interferograms of in each case at least two of the generated designs. In the subsequent fifth step S5 of the design method, a combination of at least two of the generated designs is selected, taking into account the identified number of disturbance points in the same position. In particular, that combination of designs is selected whose number of disturbance points in the same position is lower than the number of disturbance points in the same position in other combinations. For example, the combination of designs can be selected such that the number of disturbance points in the same position becomes minimal. According to one embodiment, the combination of designs is selected in which the number of disturbance points in the same position falls below a specified threshold value. For the case in which error budgets have been calculated in accordance with step S3, the calculated error budgets can also be taken into account when selecting the combination of designs.

The above description of exemplary embodiments, embodiments or embodiment variants is to be understood to be by way of example. The disclosure effected thereby firstly enables the person skilled in the art to understand the present invention and the advantages associated therewith, and secondly encompasses alterations and modifications of the described structures and methods that are also obvious in the understanding of the person skilled in the art. Therefore, all such alterations and modifications, insofar as they fall within the scope of the invention in accordance with the definition in the accompanying claims, and equivalents are intended to be covered by the protection of the claims.

LIST OF REFERENCE SIGNS

10 Measurement arrangement
12 Optical surface
14 Test object
16 Radiation source
18 Input wave
20 Waveguide
22 Exit surface
24 Wavelength adjustment controller
26 Deflection mirror
28 First holding device
30 First diffractive optical element
32 Second diffractive optical element
34 Test wave
34r Returning test wave
36 Reference wave
36r Returning reference wave
38 Reference element
40 Diffraction structures
42 Second holding device
44 Capturing device
46 Beam splitter
48 Interferometer camera
50 Eyepiece
52 Detector
54 Evaluation unit
56-1 Disturbance point distribution of the first interferogram
56-2 Disturbance point distribution of the second interferogram
57 Disturbance starting points
58 Disturbance points
60 Disturbance wave
61-3 Disturbance wave deflection point
62 First tilt axis of the first holding device
64 Second tilt axis of the first holding device
66 First tilt axis of the second holding device
68 Second tilt axis of the second holding device
70 Third tilt axis of the second holding device
72 First translation device of the second holding device
74 Second translation device of the second holding device
76 Third translation device of the second holding device
78 Third holding device
80 First tilt axis of the third holding device
82 Second tilt axis of the third holding device
84 Tilt axis of the deflection mirror
102 First calibration mirror
104 Second calibration mirror
106 Third calibration mirror
108 First calibration wave
110 Second calibration wave
112 Third calibration wave
130 First diffractive element
140 Diffraction structures
230 First diffractive optical element
232 Second diffractive optical element
238 Reference element
240 Diffraction structures

What is claimed is:

1. A method for designing phase gratings, comprising:
generating a multiplicity of different designs of a phase grating, each of which is configured to generate a respective test wave from an input wave radiated onto the phase grating, based on specified boundary conditions,
generating respective interferograms, corresponding respectively to the different designs, in a measurement arrangement by superimposing the test wave assigned to the respective design with a reference wave,
determining positions of disturbance points for each of the generated designs that are contained in the respective interferograms, wherein the disturbance points are each caused by three wave superposition of the test wave, the reference wave and a disturbance wave, wherein the disturbance wave is generated at a disturbance starting point of the respective phase grating and differs from the test wave at the disturbance starting point in wavefront and/or propagation direction,
identifying disturbance points in mutually same positions in the interferograms of, in each case, at least two of the generated designs, and
selecting a combination of at least two of the generated designs, taking into account an identified number of the disturbance points in the mutually same positions in comparison with other combinations of the generated designs.

2. The method as claimed in claim 1,
wherein at least one of the disturbance points of one of the generated designs is generated by a disturbance wave that is generated at a point of the phase grating assigned to the disturbance point, which disturbance wave is generated from the input wave, a propagation direction of which corresponds to a propagation direction of the test wave and a wavefront of which differs from the wavefront of the test wave.

3. The method as claimed in claim 1, wherein the designs relate to complex coded phase gratings and each has at least two diffractive structure patterns arranged in superposition to one another.

4. The method as claimed in claim 3, wherein, due to an interaction of the input wave with the diffractive structure patterns, which interaction is of a different type than when generating the test wave, the disturbance wave has a wavefront which differs from the wavefront of the test wave.

5. The method as claimed in claim 1, further comprising:
calculating an error budget that characterizes wavefront errors of the test wave caused by known manufacturing inaccuracies for each of the generated designs, and
wherein the calculated error budgets of the generated designs are taken into account in said selecting of the combination of at least two of the generated designs.

6. A method for designing phase gratings, comprising:
generating a multiplicity of different designs of a phase grating, each of which is configured to generate a respective test wave from an input wave radiated onto the phase grating, based on specified boundary conditions,
generating respective interferograms, corresponding respectively to the different designs, in a measurement arrangement by superimposing the test wave assigned to the respective design with a reference wave which has been reflected by a reference element;
determining positions of disturbance points for each of the generated designs that are contained in interferograms corresponding respectively to the different designs,
identifying disturbance points in mutually same positions in the interferograms of, in each case, at least two of the generated designs, wherein the disturbance points are each caused by three wave superposition of the test wave, the reference wave and a disturbance wave, wherein the disturbance wave is generated at a disturbance starting point of the respective phase grating and differs from the test wave at the disturbance starting point in wavefront and/or propagation direction, and
selecting a combination of at least two of the generated designs, taking into account an identified number of the disturbance points in the mutually same positions in comparison with other combinations of the generated designs.

7. The method as claimed in claim 6, wherein the disturbance wave is generated with a propagation direction of which corresponds to a propagation direction of the test wave and a wavefront of which differs from the wavefront of the test wave.

8. The method as claimed in claim 6, wherein the designs relate to complex coded phase gratings and each has at least two diffractive structure patterns arranged in superposition to one another.

9. The method as claimed in claim 8, wherein, due to an interaction of the input wave with the diffractive structure patterns, which interaction is of a different type than when generating the test wave, the disturbance wave has a wavefront which differs from the wavefront of the test wave.

10. The method as claimed in claim 6, further comprising:
calculating an error budget that characterizes wavefront errors of the test wave caused by known manufacturing inaccuracies for each of the generated designs, and
wherein the calculated error budgets of the generated designs are taken into account in said selecting of the combination of at least two of the generated designs.

\* \* \* \* \*

UNITED STATES PATENT AND TRADEMARK OFFICE
CERTIFICATE OF CORRECTION

| | | |
|---|---|---|
| PATENT NO. | : 12,332,043 B2 | Page 1 of 1 |
| APPLICATION NO. | : 17/481862 | |
| DATED | : June 17, 2025 | |
| INVENTOR(S) | : Stiepan et al. | |

It is certified that error appears in the above-identified patent and that said Letters Patent is hereby corrected as shown below:

On the Title Page

Page 2, Column 2, under item (56), 'OTHER PUBLICATIONS', Line 10, delete "1str" and insert -- 1st --.

Signed and Sealed this
Fourth Day of November, 2025

John A. Squires
*Director of the United States Patent and Trademark Office*